United States Patent Office 2,979,533
Patented Apr. 11, 1961

2,979,533

POLYOXYALKYLENE ETHER SURFACE-ACTIVE COMPOSITIONS

Herman A. Bruson, North Haven, and Thomas P. O'Day, Hamden, Conn., assignors to Olin Mathieson Chemical Corporation No Drawing. Filed July 31, 1958, Ser. No. 752,190

3 Claims. (Cl. 260—613)

This invention relates to novel surface-active compositions and particularly to novel organic compounds displaying advantageous surface-active properties and which are readily dispersible in aqueous solutions to provide desirably low values of surface and interfacial tension, combined with reduced foaming characteristics. The novel compounds are especially adapted for use as surfactants, including use as detergents, emulsifiers, wetting-out agents, penetrants, dyeing assistants and the like, generally in neutral or alkaline solutions. More specifically, this invention provides a new class of non-ionic surfactants which combine effective surface-active properties with greatly reduced foaming characteristics, and which are well adapted for use in automatic dishwashing, dyeing and laundry machines operating at or above normal room temperatures.

The invention also comprehends a process for the chemical modification of previously known non-ionic surfactants to effect a significant reduction of the tendency to produce a stable foam, when an aqueous dispersion thereof is subjected to agitation, without deleteriously affecting the surface-active properties.

The most common non-ionic surfactants commercially available at present are derived by condensing a water-insoluble organic compound containing a reactive hydrogen atom, termed the "hydrophobe," with a plurality of moles of ethylene oxide so as to form water-soluble products, which possess the charcteristic properties associated with surfactants; namely, low surface tension, low interfacial tension between water and oils, and foamy, soap-like properties in general.

Typical water-insoluble hydrophobes used for this purpose are:

(a) Long chain aliphatic, arylaliphatic, or cycloaliphatic alcohols R—OH, having from 8 to 22 carbon atoms in the aliphatic portion of the molecule, such as octyl, isononyl, decyl, dodecyl, isotridecyl, tetradecyl, hexadecyl, octadecyl, eicosanyl, oleyl, linoleyl, 9- or 10-phenylstearyl alcohol; octylcyclohexanol, dodecylcyclohexanol, abietyl and perhydro-abietyl alcohol; R being the aliphatic, arylaliphatic or cycloaliphatic hydrocarbon group of said alcohol.

(b) Alkylated phenols having from 4 to 22 carbon atoms in the alkyl group attached to the phenolic benzene ring, such a p-tert-butylphenol, p-sec-amylphenol, n-hexylphenol, p-cyclohexylphenol, p-tert-octylphenol, iso-nonylphenol, dodecylphenol, iso-tridecylphenol, hexadecylphenol, octadecylphenol, eicosanylphenol, etc., as well as the corresponding alkylated cresols, xylenols and naphthols; such phenols having the formula R—OH wherein R is the alkylated aryl nucleus.

Upon condensation with ethylene oxide, such hydrophobes yield polyether alcohols having the general formula:

$$R[-O-CH_2CH_2-]_nOH$$

wherein R represents the organic radical of the hydrophobe (R being for example the long chain alkyl, alkenyl, cycloalkyl, aralkyl group or alkylated aryl radical as set forth above) and "n" is a number from about 5 to 40.

Typical of commercially available compositions of the above types are the following:

2,6,8-trimethyl-4-nonyl-[O—CH$_2$CH$_2$]$_n$OH    n=5–12
Iso-tridecyl-[O—CH$_2$CH$_2$]$_n$OH    n=6–15
n-Octadecyl-[O—CH$_2$CH$_2$]$_n$OH    n=12–20

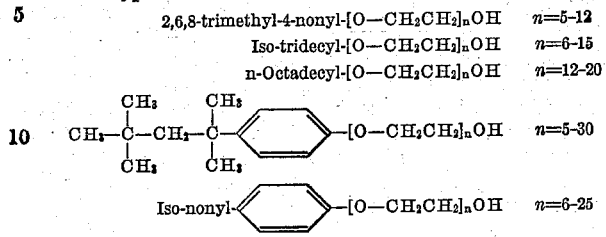
n=5–30

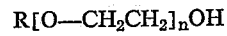
n=6–25

In general, these non-ionic water-dispersible surfactants possess a very high foaming tendency in aqueous solution.

In accordance with this invention, the foaming characteristics of non-ionic water-dispersible surfactants having the general formula $$R[O-CH_2CH_2]_nOH$$

as hereinabove described, are significantly reduced by reaction with an aldehyde in the presence of an acidic catalyst so as to split out water and form an acetal or formal. The aldehydes preferred for this purpose are formaldehyde, acetaldehyde and propionaldehyde.

For the optimum reduction in foaming tendencies, a suitable balance between the value of "n," the size of the hydrophobe group R, and aldehyde used, should preferably be maintained. For example, when "n" is equal to from 5 to 10, the lower aliphatic aldehydes having from 1 to about 3 carbon atoms are generally most effective.

The reaction which occurs between the aldehyde Y—CHO and the non-ionic water-dispersible surfactant in the presence of the acidic catalyst is formulated in its simplest form as follows:

$$2R-[O-CH_2CH_2]_nOH+Y-CHO \longrightarrow$$

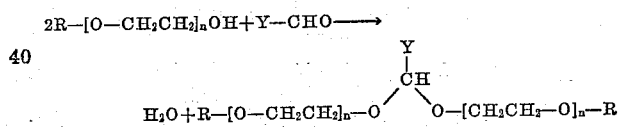

wherein Y is either hydrogen or the organic radical to which the aldehyde group is attached.

The novel water-soluble or water-dispersible surfactants of this invention are represented by the general product formula in the above reaction.

As acidic catalysts in the process of this invention, use can be made of phosphoric acid, hydrochloric acid, sulfuric acid, zinc chloride, organic sulfonic acids, strongly acidic ion-exchange resins or natural acid clays consisting essentially of aluminum magnesium hydrosilicates which are commercially available, such as "Tonsil" (Salamon Bros., N.Y.) or "Atapulgas" (Atapulgas Clay Corp., Pittsburgh, Pa.) as well as others.

In the reaction, the aldehydes may be replaced by aldehyde derivatives which readily yield the starting material, such as the aldehyde polymers or the simple formals or acetals. For example, formaldehyde may be replaced in whole or in part by para-formaldehyde, trioxane, methylal, ethylal or the like. Likewise, acetaldehyde may be replaced in whole or in part by paraldehyde or suitable acetals such as acetaldehyde dimethyl or diethyl acetal.

Illustrative embodiments of the invention are described in detail in the following specific examples.

EXAMPLE 1

A reaction flask was equipped with stirrer, thermometer, condenser and Dean-Stark trap. Into the flask a 170.4 g. portion of a non-ionic water-dispersible surfactant made from p-tertiary octylphenol and five moles of ethylene oxide, having the formula:

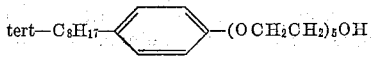

was placed, together with 6.0 g. of phosphoric acid (85%), 125 cc. of benzene and 6.9 g. of paraformaldehyde. The mixture was refluxed at 84°–92° C. for 3 hours, the water of reaction being removed as it formed. The mixture was then cooled to room temperature and neutralized with stirring by means of powdered sodium carbonate containing a little water. Finally, the mixture was filtered, and the benzene was removed by distillation under vacuum. The final product obtained was 169 g. of a clear, very light yellow oil.

EXAMPLE 2

Into a reaction flask, there was placed a 205.6 g. portion of a non-ionic water-dispersible detergent made from p-tertiary octylphenol and seven moles of ethylene oxide, having the formula:

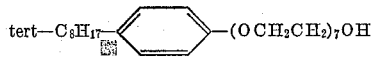

together with 20.5 g. of acid "Tonsil" clay (magnesium aluminum hydro-silicate), 150 cc. of benzene and 6.9 g. of paraformaldehyde. The mixture was refluxed at 82°–95° C. for 3 hours, water of reaction being removed as it formed. The mixture was then filtered, and the benzene was removed by distillation in vacuo. The final product obtained was 199.7 g. of a clear light yellow oil.

EXAMPLE 3

Into a reaction flask there was placed a 240.8 g. portion of a non-ionic water-dispersible surfactant having the formula:

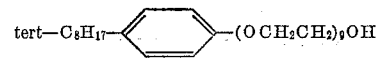

together with 24.1 g. of acid "Tonsil" clay, 150 cc. of benzene and 6.9 g. of paraformaldehyde. The mixture was refluxed at 82°–95° C. for 3½ hours, the water of reaction being removed as it formed. The mixture was then filtered, and the benzene was removed by distillation in vacuo. The product consisted of 235.0 g. of a clear light yellow oil.

EXAMPLE 4

In a reaction flask, there was placed a 205.6 g. portion of

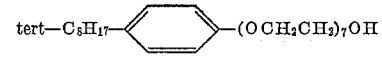

together with 10.3 g. of acid "Tonsil" clay, 125 cc. of benzene and 13.4 g. of propionaldehyde. The mixture was refluxed at 82°–96° C. for 3 hours, the water of reaction being removed as it was formed. The mixture was then filtered, and the benzene was removed by distillation in vacuo. The product consisted of 205.0 g. of a clear light yellow oil.

EXAMPLE 5

In a reaction flask, there was placed a 240.8 g. portion of

together with 12.0 g. of acid "Tonsil" clay, 125 cc. of benzene and 13.4 g. of propionaldehyde. The mixture was refluxed at 80°–96° C. for three hours, the water of reaction being removed as it formed. The mixture was then filtered, and the benzene was removed by distillation in vacuo. The product consisted of 234.5 g. of a clear light yellow oil.

EXAMPLE 6

In a reaction flask, there was placed a 205.6 g. portion of

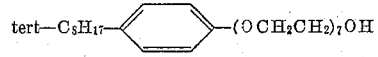

together with 20.5 g. of acid "Tonsil" clay, 150 cc. of benzene and 24.4 g. of benzaldehyde. The mixture was refluxed for 9 hours at 83°–94° C., the water of reaction being removed as it formed. The mixture was then filtered, and all volatile material removed by distillation in vacuo. The product consisted of 204.0 g. of a clear light yellow oil.

EXAMPLE 7

In a reaction flask, there was placed a 205.6 g. portion of

together with 20.5 g. of acid "Tonsil" clay, 150 cc. of benzene and 10.1 g. of paraldehyde. The mixture was refluxed for 3 hours at 82°–92° C., the water of reaction being removed as it formed. The mixture was then filtered, and all volatile material was removed by distillation in vacuo. The product consisted of 198.5 g. of a clear light yellow oil.

EXAMPLE 8

In a reaction flask equipped with a reflux condenser, thermometer, stirrer and Dean-Stark water trap, there was placed a 228.8 g. portion of a non-ionic water-dispersible surfactant made from p-iso-nonylphenol and eight moles of ethylene oxide, having the formula:

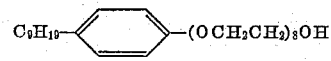

together with 8.5 g. of 85% phosphoric acid, 160 cc. of benzene and 6.9 g. of paraformaldehyde. The mixture was stirred and refluxed at 87°–92° C. for three hours; the water of reaction being removed as it was formed. The mixture was then cooled to room temperature and neutralized with powdered sodium carbonate mixed with a few cc. of water. The mixture was filtered, and the benzene was removed from the filtrate by distillation in vacuo. The final product consisted of 228.5 g. of a light yellow oil.

EXAMPLE 9

A mixture of 175 g. of a non-ionic water-dispersible surfactant made from isotridecyl alcohol and 5–6 moles of ethylene oxide, having the formula:

$C_{13}H_{27}(OCH_2CH_2)_{5.4}OH$ together with 8.0 g. of 85% phosphoric acid, 150 cc. of toluene and 6.9 g. of paraformaldehyde was placed in a vessel as in Example 8. The mixture was refluxed at 104°–111° C. for three hours, with water being removed as it formed. The mixture was cooled to room temperature and neutralized with powdered sodium carbonate. The mixture was then filtered and the toluene was removed by distillation in vacuo. The product consisted of 174.6 g. of a light yellow oil.

EXAMPLE 10

In a reaction flask as described above, there was placed a 170.8 g. portion of a non-ionic surfactant made from p-cyclohexylphenol and 5–6 moles of ethylene oxide, having the formula:

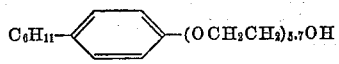

together with 7.0 g. of 85% phosphoric acid, 150 cc. of benzene and 6.9 g. of paraformaldehyde. The mixture was refluxed at 87°–93° C. for three hours, with water being removed as it formed. The mixture was cooled to room temperature and neutralized with powdered sodium carbonate. The mixture was then filtered, and the benzene was removed by distillation in vacuo. The product consisted of 170.2 g. of a clear light red oil.

EXAMPLE 11

In a reaction flask equipped with a reflux condenser, thermometer, stirrer and Dean-Stark water trap, there was placed 228.4 g. of a non-ionic surfactant made from p-octylphenol and 8–9 moles of ethylene oxide, having the formula:

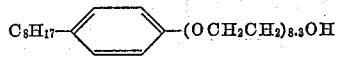

together with 6.0 g. of 85% phosphoric acid, 175 cc. of benzene and 6.9 g. of paraformaldehyde. The mixture was refluxed at 88°–93° C. for three hours, with water being removed as it formed. The mixture was then cooled to room temperature and neutralized with powered sodium carbonate. Finally the mixture was filtered, and the benzene was removed by distillation in vacuo. The product consisted of 227 g. of light yellow oil.

EXAMPLE 12

In a reaction flask as described above there was placed a 160.4 g. portion of a non-ionic surfactant made from p-butylphenol and 5–6 moles of ethylene oxide, having the formula:

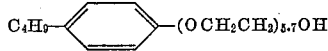

together with 6.0 g. of 85% phosphoric acid, 160 cc. of benzene and 6.9 g. of paraformaldehyde. The mixture was refluxed at 85°–91° C. for three hours, the water of reaction being removed as it formed. After cooling to room temperature, the mixture was neutralized with powdered sodium carbonate and filtered. The benzene was then removed by distillation in vacuo. The product consisted of 161 g. of a light yellow oil.

In each of the above examples, close to the theoretical amount of water was collected in the reflux trap, corresponding to the formation of one mole of water for each two moles of the alcohol

or for each mole of the aldehyde consumed in the reaction. Confirmation was thus provided that the products consisted of acetals or formals; furthermore, the products could be decomposed by concentrated acids to yield the starting alcohol and aldehyde.

The reaction may be carried out at above room temperature, generally within the range of 50° to 150° C., and preferably at about 75° to 125° C. Control of temperature and removal of water from the reaction mixture are generally facilitated by carrying out the reaction in the presence of an inert water-immiscible solvent such as benzene, toluene, xylene, or the like at the reflux temperature thereof. However, the reaction proceeds satisfactorily in the absence of such solvent by maintaining the reaction mixture at a proper temperature within the above range, water being removed by evaporation, and, if desired, by means of a stream of inert gas such as nitrogen.

It will be advantageous at times to form a mixture of reaction products in accordance with this invention by using a mixture of aldehydes or of the alcoholic starting material or both, in order to obtain the desired combination of surface and interfacial tensions as well as other characteristics. It is also to be understood that when a dialdehyde such as glyoxal is used as reagent, each aldehyde group can be reacted with two moles of the starting alcoholic reagent.

Each of the products of the above specific examples was readily dispersible in aqueous solutions and at a concentration of 0.05% by weight in water, displayed a value of surface tension less than 40 dynes per centimeter, generally between 33 and 37 dynes per centimeter. At the above concentration, values of interfacial tension against a purified mineral oil such as "Nujol" ranged generally between 2 and 12 dynes per cm., as typified by the following measured values:

Table 1

| Formula—Alcohol | Product of Example | Surface Tension (0.05% by weight), dynes/cm. | Interfacial Tension (0.05% by weight), dynes/cm. |
|---|---|---|---|
| R(OCH₂CH₂)₅OH | 1 | 36.5 | 10.8 |
| R(OCH₂CH₂)₇OH | 2 | 33.1 | 4.0 |
| R(OCH₂CH₂)₉OH | 3 | 33.5 | 2.1 |
| R(OCH₂CH₂)₈.₃OH | 11 | 34.5 | 2.8 |

While products in accordance with this invention provide highly desirable surface-activity, the outstanding advance is with respect to a substantially decreased tendency to produce foam, particularly foam which tends to persist, when aqueous dispersions are subjected to agitation.

The following determinations of foam height of the novel formals and acetals of the above examples in comparison with the starting polyether alcohols were made in accordance with the Ross-Miles foam test, ASTM-D-1173–53, as described in ASTM Standards, Part 7, p. 750 (1955), carried out at 60° C.

Table 2

[FOAM HEIGHTS, AT 60° C. (ROSS-MILES TEST), IN MM.]

| Concn. | Time=0 seconds | | | | Time=5 minutes | | | |
|---|---|---|---|---|---|---|---|---|
|  | 0.5% | .25% | .10% | .05% | 0.5% | .25% | .10% | .05% |
| Example: | | | | | | | | |
| 1 {Alcohol | 22 | 18 | 28 | 22 | 10 | 8 | 3 | 2 |
| {Formal | 10 | 10 | 8 | 6 | 0 | 0 | 0 | 0 |
| 2 {Alcohol | 95 | 80 | 90 | 90 | 20 | 20 | 15 | 25 |
| {Formal | 35 | 25 | 15 | 15 | 3 | 3 | 3 | 3 |
| 3 {Alcohol | 195 | 190 | 100 | 95 | 25 | 15 | 15 | 15 |
| {Formal | 30 | 30 | 35 | 15 | 10 | 10 | 5 | 5 |
| 4 {Alcohol | 95 | 80 | 90 | 90 | 20 | 20 | 15 | 25 |
| {Propional | 30 | 15 | 20 | 10 | 5 | 5 | 5 | 5 |
| 5 {Alcohol | 195 | 190 | 100 | 95 | 25 | 15 | 15 | 15 |
| {Propional | 15 | 25 | 20 | 15 | 5 | 5 | 15 | 10 |
| 6 {Alcohol | 95 | 80 | 90 | 90 | 20 | 20 | 15 | 25 |
| {Benzal | 20 | 25 | 35 | 30 | 5 | 5 | 8 | 5 |
| 7 {Alcohol | 95 | 80 | 90 | 90 | 20 | 20 | 15 | 25 |
| {Acetal | 20 | 20 | 15 | 25 | 5 | 5 | 10 | 10 |
| 8 {Alcohol | 60 | 50 | 60 | 50 | 50 | 50 | 45 | 40 |
| {Formal | 35 | 25 | 20 | 20 | 15 | 10 | 5 | 5 |
| 9 {Alcohol | 125 | 125 | 110 | 75 | 50 | 95 | 25 | 25 |
| {Formal | 30 | 30 | 30 | 30 | 5 | 5 | 10 | 10 |
| 10 {Alcohol | 100 | 105 | 95 | 95 | 25 | 35 | 45 | 45 |
| {Formal | 15 | 15 | 5 | 0 | 0 | 0 | 0 | 0 |
| 11 {Alcohol | 195 | 175 | 130 | 90 | 70 | 45 | 35 | 30 |
| {Formal | 55 | 60 | 65 | 60 | 5 | 10 | 10 | 15 |
| 12 {Alcohol | 175 | 160 | 90 | 60 | 80 | 100 | 60 | 15 |
| {Formal | 10 | 5 | 10 | 5 | 5 | 0 | 5 | 0 |

The novel products of this invention listed in the above table are represented by the following formulae:

| Example | Formal or Acetal |
|---|---|
| 1 | $[C_8H_{17}\text{-}\langle\bigcirc\rangle\text{-}(OCH_2CH_2)_5O]_2CH_2$ |
| 2 | $[C_8H_{17}\text{-}\langle\bigcirc\rangle\text{-}(OCH_2CH_2)_7O]_2CH_2$ |
| 3 | $[C_8H_{17}\text{-}\langle\bigcirc\rangle\text{-}(OCH_2CH_2)_9O]_2CH_2$ |
| 4 | $[C_8H_{17}\text{-}\langle\bigcirc\rangle\text{-}(OCH_2CH_2)_7O]_2CHCH_2CH_3$ |
| 5 | $[C_8H_{17}\text{-}\langle\bigcirc\rangle\text{-}(OCH_2CH_2)_9O]_2CHCH_2CH_3$ |
| 6 | $[C_8H_{17}\text{-}\langle\bigcirc\rangle\text{-}(OCH_2CH_2)_7O]_2CHC_6H_5$ |
| 7 | $[C_8H_{17}\text{-}\langle\bigcirc\rangle\text{-}(OCH_2CH_2)_7O]_2CHCH_3$ |
| 8 | $[C_9H_{19}\text{-}\langle\bigcirc\rangle\text{-}(OCH_2CH_2)_8O]_2CH_2$ |
| 9 | $[C_{13}H_{27}(OCH_2CH_2)_{5.4}O]_2CH_2$ |
| 10 | $[C_6H_{11}\text{-}\langle\bigcirc\rangle\text{-}(OCH_2CH_2)_{5.7}O]_2CH_2$ |
| 11 | $[C_8H_{17}\text{-}\langle\bigcirc\rangle\text{-}(OCH_2CH_2)_{8.3}O]_2CH_2$ |
| 12 | $[C_4H_9\text{-}\langle\bigcirc\rangle\text{-}(OCH_2CH_2)_{5.7}O]_2CH_2$ |

The test values in the above table show significant improvement in the reduction of the quantity and persistence of foam accomplished in accordance with this invention. Thus, this invention enables the formulation of improved surface-active materials having the desired combination of properties for optimum performance in accordance with requirements.

We claim:

1. A water-dispersible product having the formula $$[R\text{-}(OCH_2CH_2)_nO]_2CH\text{---}Y$$

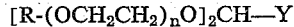

wherein R is an hydrophobic organic radical selected from the group consisting of an aliphatic saturated hydrocarbon radical containing 13 carbon atoms and a phenyl radical having an alkyl substituent containing 4 to 9 carbon atoms, and Y is a member of the group consisting of hydrogen, methyl and ethyl, and $n$ is a number from about 5 to 10.

2. A water-dispersible product having the formula

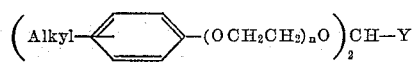

wherein "$n$" is a number from about 5 to 10, the alkyl group contains 4 to 9 carbon atoms and Y is a member of the group consisting of hydrogen, methyl and ethyl.

3. A water-dispersible product having the formula $$[R\text{---}(OCH_2CH_2)_nO]_2CH_2$$

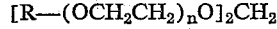

wherein R is (tertiaryoctyl)-phenyl and "$n$" is a number from about 5 to 10.

References Cited in the file of this patent
UNITED STATES PATENTS

| | | |
|---|---|---|
| 1,970,578 | Schoeller et al. | Aug. 21, 1934 |
| 2,609,344 | Johnson | Sept. 2, 1952 |
| 2,630,440 | Gunderson | Mar. 3, 1953 |
| 2,850,535 | Lane | Sept. 2, 1958 |